United States Patent [19]
Kauling et al.

[11] Patent Number: 5,198,105
[45] Date of Patent: Mar. 30, 1993

[54] DEVICE FOR SOLIDS RECYCLE IN LONGITUDINAL-FLOW FLUID-BED REACTORS FOR EFFLUENT TREATMENT WITH CARRIER PARTICLES

[75] Inventors: Jörg Kauling, Cologne; Hans-Jürgen Henzler, Solingen; Imre Pascik, Monheim; Georg Lamp, Leverkusen, all of Fed. Rep. of Germany

[73] Assignee: Bayer Aktiengesellschaft, Leverkusen, Fed. Rep. of Germany

[21] Appl. No.: 671,280

[22] Filed: Mar. 18, 1991

[30] Foreign Application Priority Data

Mar. 22, 1990 [DE] Fed. Rep. of Germany ....... 4009180

[51] Int. Cl.$^5$ .............................. C02F 3/08; C02F 3/22
[52] U.S. Cl. ..................................... 210/151; 210/616; 210/620; 210/629
[58] Field of Search ............... 210/616, 617, 618, 268, 210/151, 786, 620, 629

[56] References Cited

U.S. PATENT DOCUMENTS

| | | | |
|---|---|---|---|
| 3,667,604 | 6/1972 | Lagoutte | 210/268 |
| 3,853,752 | 12/1974 | Tymoszczuk | 210/268 |
| 4,060,484 | 11/1977 | Austin et al. | 210/786 |
| 4,076,615 | 2/1978 | Olesen et al. | 210/616 |
| 4,246,102 | 1/1981 | Hjelmner et al. | 210/786 |
| 4,415,454 | 11/1983 | Fuchs | 210/616 |
| 4,479,876 | 10/1984 | Fuchs | 210/616 |
| 4,521,311 | 6/1985 | Fuchs et al. | 210/616 |
| 4,566,971 | 1/1986 | Reimann et al. | 210/616 |
| 4,663,046 | 5/1987 | Feldkirchner et al. | 210/616 |
| 4,707,252 | 11/1987 | Durot et al. | 210/151 |
| 4,720,347 | 1/1988 | Berne | 210/792 |
| 4,954,257 | 9/1990 | Vogelpohl et al. | 210/151 |
| 5,037,551 | 8/1991 | Barkley et al. | 210/617 |

Primary Examiner—Stanley S. Silverman
Assistant Examiner—Cynthia L. Nessler
Attorney, Agent, or Firm—Sprung, Horn, Kramer & Woods

[57] ABSTRACT

The fluid-bed reactor for biological effluent treatment, using carrier particles for microorganisms, consists of a tank with a retention system for the carrier particles, gas supply units and a jet ejector arranged along the tank for the particle recycle. The propulsion nozzle of the jet ejector is fed with the effluent stream which is to be treated.

8 Claims, 4 Drawing Sheets

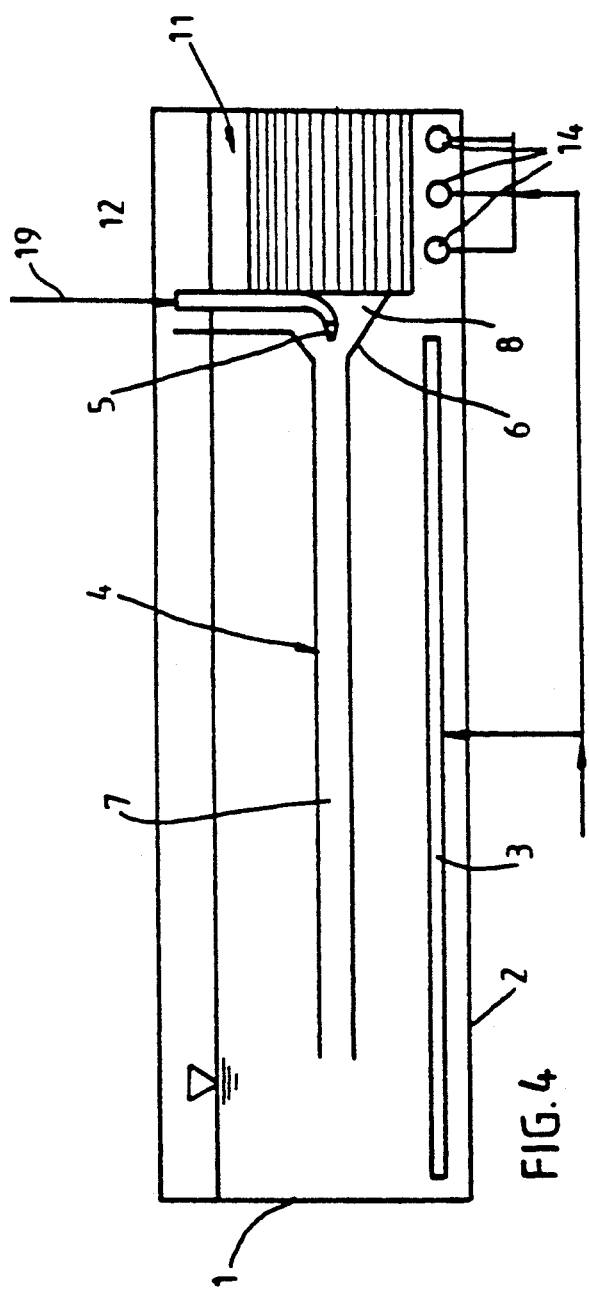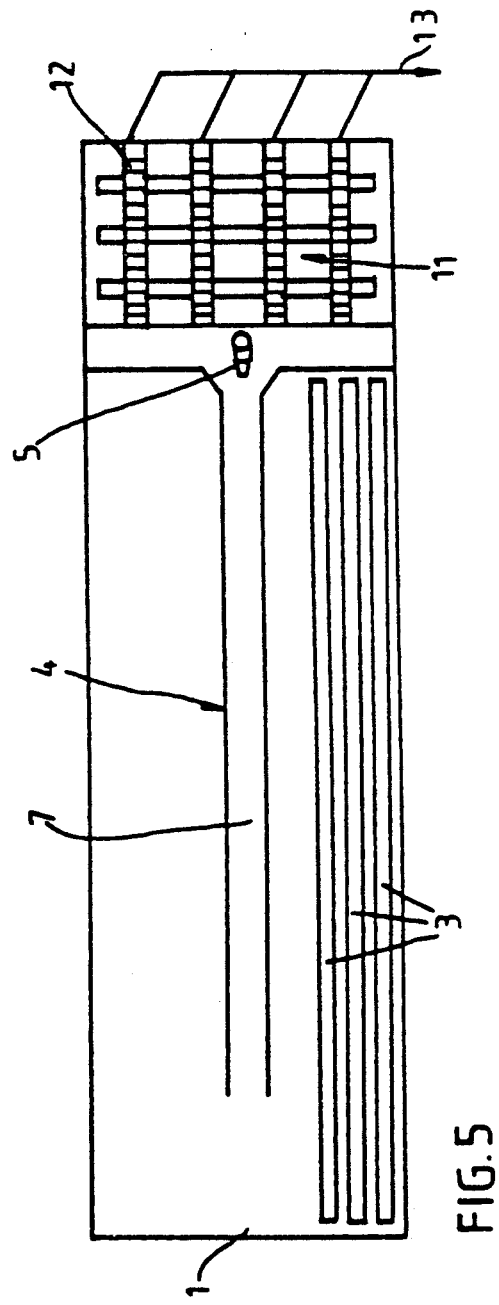

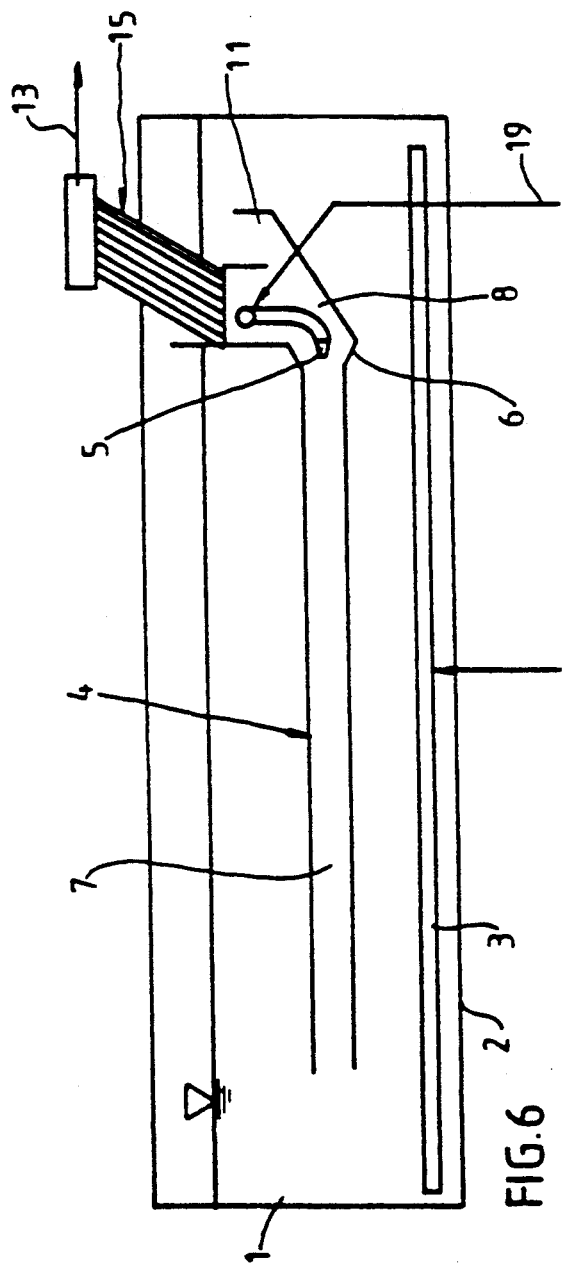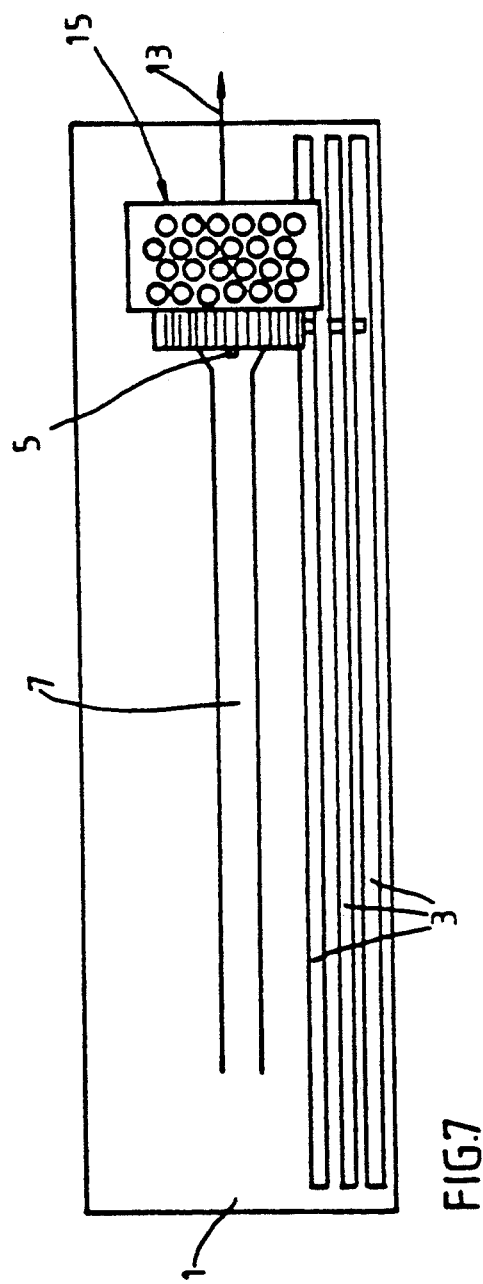

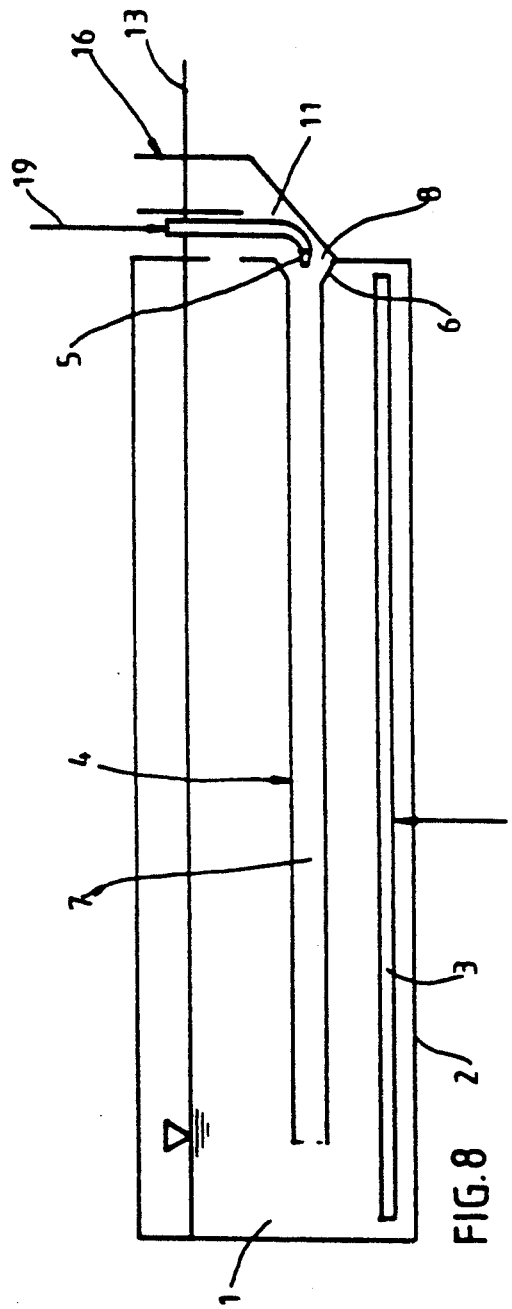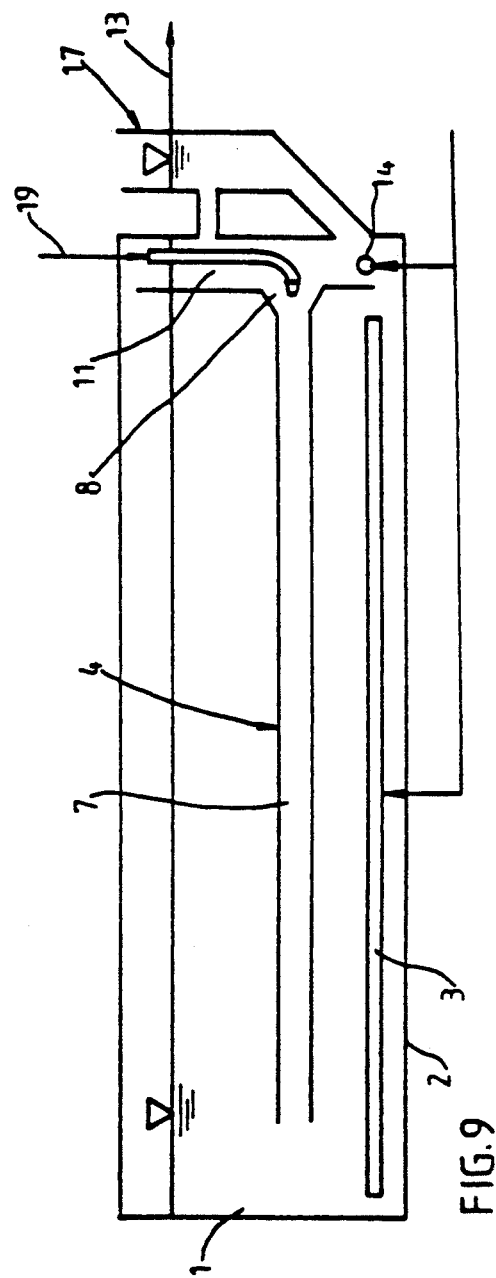

DEVICE FOR SOLIDS RECYCLE IN LONGITUDINAL-FLOW FLUID-BED REACTORS FOR EFFLUENT TREATMENT WITH CARRIER PARTICLES

BACKGROUND OF THE INVENTION

The invention to a fluid-bed reactor for biological effluent treatment with carrier particles for biocatalysts, having a system for separating out the carriers in the effluent outflow and a device for recycling the solids particles in the reactor tank.

In effluent treatment, carrier bodies for the microorganisms are increasingly used in order to increase the activity. Both fixed-bed reactors and fluid-bed reactors are used in this process. In fixed-bed reactors, only a part of the reactor space is utilised because of irregular growth which establishes itself naturally. Moreover, uniform process conditions (such as, for example, pH value) cannot be maintained in the fixed bed. In the event of fluctuations of the concentration in the feed, the buffering action of submerged biology is not fully exploited due to inadequate mixing.

Thoroughly mixed fluid-bed reactors, in which the carriers for the microorganisms are suspended are therefore more suitable for effluent treatment. The German patent specification No. DE-A 3,829,873, describes how the fluidisation mixing is effected by supplying gas to the liquid.

In longitudinal-flow units with a large length/width or height ratio, the solids particles are, in spite of relatively ideal mixing of the liquid phase, transported to the reactor outlet and concentrated there in the vicinity of the retention device, with the result that the major part of the reactor remains free of particles. Since a large part of the microorganisms is located on the solids particles, only restricted biodegradation of the effluent load takes place with this procedure. It is therefore necessary to ensure, by special measures, that the particles are distributed relatively uniformly throughout the reactor contents. Hitherto, special gas supply techniques, (see, for example, European Patent No. 0,163,159) or mechanical recycling (German Patent No. 3,408,759) have been proposed for solving this problem.

In the gas supply technique, a simultaneous reduction of the gas supply intensity in the longitudinal direction of the effluent tank is accepted. Since, however, the gas supply intensity must not be less than that required for fluidizing the solids particles, this technique can be applied only with increased energy consumption.

In mechanical recycling, the particles are removed from the tank by an airlift and transported by a conveyor belt to the inlet of the effluent tank. The disadvantage in this method is the additional expense on investment and energy costs.

SUMMARY OF THE INVENTION

The invention is based on the object of effecting a solids recycle, in a fluid-bed reactor which allows the movement of the carrier particles in a manner which is advantageous, particularly in energy terms.

More particularly, an object of the invention is the uniform distribution of the particles in the reactor in a manner which is likewise advantageous in energy terms.

In a fluid-bed reactor with gas supply units and a retention system for the carrier particles and also a device for particle recycle in the reactor. These objects are achieved, according to the invention, when the device for the particle recycle consists of a jet ejector arranged along the reactor 1 and having a mixer tube, an inlet to the mixer tube and a propulsion nozzle to which the effluent stream flowing in is charged.

Advantageously, the suction chamber of the jet ejector adjoins the filter chamber, from which the discharge of the filtered effluent takes place. The suction chamber is here advantageously separated from the remaining reactor space by baffles.

According to a preferred embodiment, the diameter of the mixer tube is less than 0.3 times and advantageously less than 0.2 times the hydraulic diameter of the reactor cross-section.

The retention system for the particles in the reactor consists preferably of filter elements in the form of slotted screens, of an inclined or vertical separator or of a circulation separator. The retention system can be arranged inside or outside the reactor.

The gas supply elements are advantageously arranged with a lateral offset relative to the tank axis, so that a large-space circulating flow is generated. They are characterised by a multiplicity of gas outlet orifices arranged closely next to one another.

Because of the small space requirement of the jet ejector, however, a gas supply covering the whole tank bottom surface can also be applied, which is of advantage whenever the limiting step is not the fluidisation of the carrier particles but the oxygen supply.

A further improvement is characterised in that additional gas supply units are provided in the filter chamber.

The following advantages are achieved by the invention:

Simple construction with relatively low capital investment cost;

Very favourable energy balance;

Small space requirement of the unit, so that a gas supply over the entire cross-section without impediment at any point is possible in principle;

Retrofitting of already existing tanks is possible; and

Operation of the unit is independent of the liquid throughput or residence time, since there is proportionality between the suction stream and the propulsion stream.

The preferred embodiments of the present invention will now be described with reference to the accompanying drawings.

BRIEF DESCRIPTION OF THE DRAWINGS

FIGS. 1 and 4 show side views of reactors with filter elements,

FIGS. 2 and 5 show plan views of the reactors according to FIGS. 1 and 4,

FIG. 6 shows a side view of a reactor with a plate separator or inclined tube separator, FIG. 7 shows a plan view of the reactor according to FIG. 6, FIG. 8 shows a side view of a reactor with a vertical separator coupled thereto and FIG. 9 shows a side view of a reactor with a circulation separator coupled thereto.

DESCRIPTION OF THE PREFERRED EMBODIMENTS

Figure 3:
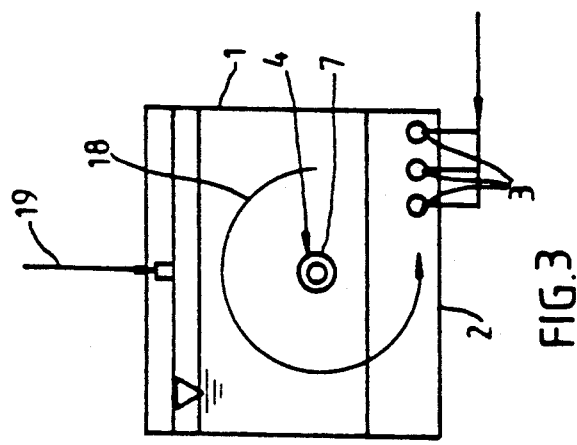
FIG. 3 shows a front view of the reactor according to FIG. 1.
Figure 1:
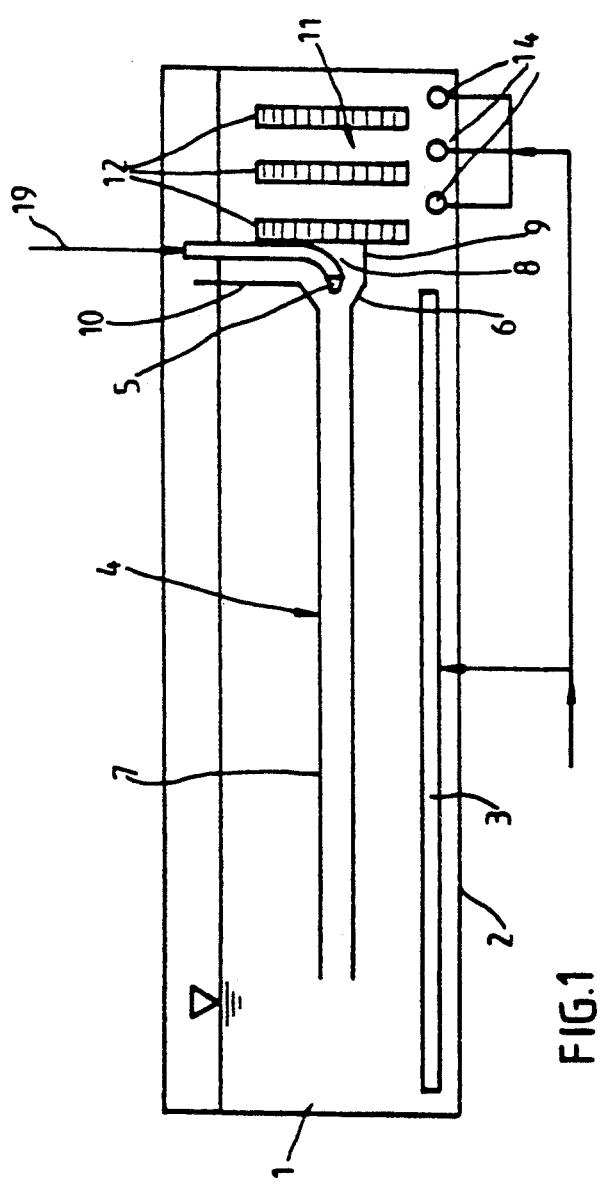
Figure 2:
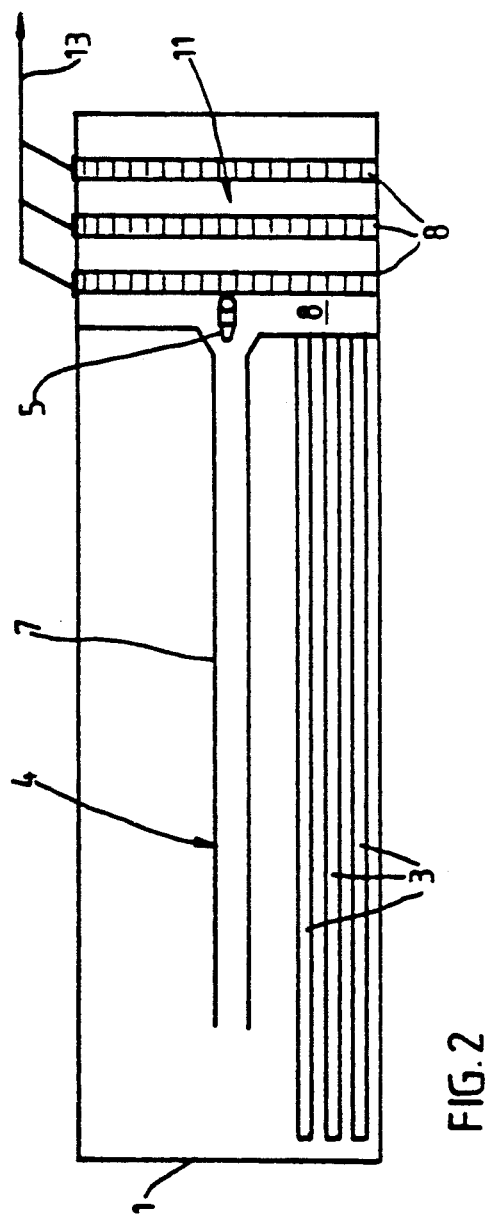

The reactor according to FIG. 1 consists of a rectangular tank 1. Gas supply units 3 are arranged just above the tank bottom 2 in the longitudinal direction between the tank center and the side wall. This generates a circulating flow which fluidizes the particles (see FIG. 3). A jet ejector 4, arranged in the center of the tank, consists of a propulsion nozzle 5, a tapering inlet 6 and a mixer tube 7. The propulsion nozzle 5 is fed by the effluent stream 19 which is to be treated. The suction chamber 8 of the jet ejector, adjoining the inlet 6, is separated from the remaining reactor volume by baffles 9, 10 and directly adjoins the filter chamber 11 of the reactor. The retention system for the carrier particles, which consists of filter elements 12 (FIGS. 1-3) in the form of slotted screens, is located in the filter chamber 11. The filtered effluent is discharged through the outflow 13. A solids concentration, which is a little higher than in the remaining part of the effluent tank, always establishes itself in the vicinity of the effluent outflow 13. This concentration difference diminishes with an increasing ratio of suction stream to propulsion stream of the jet ejector 4. As a result of the installation of the baffles 9 and 10 which prevent a direct connection of the suction chamber 8 to the reactor space of lower particle concentration, this concentration difference can be minimised at a given ratio of suction stream to propulsion stream.

As a further important condition for trouble-free operation of the device, the velocity in the mixer tube of the jet ejector must not fall below the settling rate of the solids particles. This condition can as a rule be met if the diameter of the mixer tube is less than 0.2 times of the hydraulic diameter of the reactor cross-section, where the hydraulic diameter is to be understood as the ratio of four times the cross-sectional area to the circumference of the flow channel. This sizing also ensures that there is no interference with the large-space circulating flow of the liquid which is required for fluidizing the solids particles.

Additional gas supply units 14 are provided in the filter chamber 11 underneath the filter elements 12. In place of filter elements, a plate separator or an inclined-tube separator 15 can also be used according to FIGS. 6 and 7. Further variants of the retention system are shown in FIGS. 8 and 9. According to FIG. 8, the retention system consists of a vertical separator 16 coupled to the side and, according to FIG. 9, of a circulation separator 17 coupled to the side. In this case, the additional gas supply units 14 are fitted underneath and immediately upstream of the circulation separator 17.

In cases where an increased introduction of oxygen is desirable, the gas supply units 3 can also be installed in a distribution to cover the surface of the entire tank bottom, so that uniform gas supply over the entire reactor cross-section takes place.

The jet ejector 4 does not necessarily have to be arranged in the center of the tank 1. It can also be accommodated with a lateral offset for outside the tank 1, in which case appropriate inlet lines to and outlet lines from the tank 1 must be provided.

ILLUSTRATIVE EXAMPLE

The rectangular reactor tank 1 has a side length of 40 m and a width of 6 m and is operated at a liquid level of 4 m.

The diameter of the propulsion nozzle 5 is 29 cm and that of the mixer tube 7 is 63 cm, and the overall length of the jet ejector 4 is 30 m. The filter chamber 11 extends over 3 m of the rear tank section.

The gas bubbles emerging from the gas supply units 3 into the effluent generate a large-space circulating flow 18 (see FIG. 3) which fluidizes the carrier particles. An analogous fluidization at the filter elements 12 and, as a result, also cleaning of the filters is achieved by the additional gas supply units 14.

In the fluid-bed reactor (tank 1), there are on average 10% by volume of polyurethane foam particles (carrier bodies) which are coated with carbon and colonised by microorganisms for effluent treatment. The mean size of these particles is 13 mm, and their density in the water-wet state is 1,025 kg/m$^3$. The carrier particles acting as a biocatalyst are held in a suspended state by a gas rate of only 1,320 m$^3$/h, which corresponds to a specific power of about 13 W/m$^3$.

The effluent stream 19 of 685 m$^3$/h, which is fed into the jet ejector 4 and leaves the reactor again via the filter elements 12 and/or the separators 15, 16 or 17, extracts a solids-laden liquid stream of approximately the same magnitude out of the suction chamber above the filter elements 12 and/or upstream of the sedimentation separators, as a result of the momentum exchange in the mixer tube 7 of the jet ejector 4. As a result, solids particles are continuously transported by the jet ejector 4 from the filter chamber 11, where the particle concentration is about 18.6% by volume, to the opposite end of the tank 1. The solids concentration at the end of the mixer tube 7 of about 9.3% by volume, which results at the aforementioned extraction rate of the jet ejector 4 and the size of the filter chamber 11, applies virtually to all the remaining volume of the effluent tank. A power consumption of merely 0.83 W/m$^3$ of tank volume is required here for operating this device, which amounts to only about 5% of the total power for operating the plant.

There has thus been shown and described a novel device for solids recycle in a fluid bed reaction which fulfills all the objects and advantages sought therefore. Many changes, modification, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a fluid bed reactor for biological effluent treatment with the aid of carrier particles suspended in the effluent, said reactor comprising an elongated tank with an inlet and outlet of the effluent, gassing means for aerating the effluent in the tank, and separation means is the outlet for retaining the particles in the tank, the improvement comprising a jet ejector including a propulsion nozzle, an intake cone surrounding the propulsion nozzle and defining a suction chamber and an elongate mixer tube coupled to the intake cone and arranged horizontally within the tank, the intake cone with its associated suction chamber adjoining the separation means for collecting carrier particles accumulated in the region of the separating means, the propulsion nozzle being connected to the effluent inlet for charging the jet ejector with the effluent stream.

2. Fluid-bed reactor according to claim 1, wherein the suction chamber is further defined by baffles arranged within the reactor tank.

3. Fluid-bed reactor according to claim 1, wherein the diameter of the mixture tube is less than 0.3 times, preferably less than 0.2 times, the hydraulic diameter of the reactor cross-section.

4. Fluid-bed reactor according to claim 1, wherein the separation means comprises filter elements selected from the group consisting of slotted screens, an inclined-channel separator and a circulation separator.

5. Fluid-bed reactor according to claim 1, wherein the gassing means comprise gas supply units arranged in the longitudinal direction laterally offset relative to the tank axis, so that a large-space circulating flow is generated.

6. Fluid-bed reactor according to claim 1, wherein the gassing means comprise gas supply units which ensure a uniform gas supply to the rector tank cross-section and hence an enhanced introduction of oxygen, said gas supply units being arranged to cover the whole tank bottom surface, with the exception of the surface underneath the mixer tube.

7. Fluid-bed reactor according to claim 1, wherein the gasing means comprise gas supply units having a multiplicity of gas outlet orifices arranged closely next to one another.

8. Fluid-bed reactor according to claim 7, wherein additional gas supply units are provided near the separation means.

* * * * *